L. R. WITHERELL.
Cane-Stripper.
No. 49,577. Patented Aug. 22, 1865.
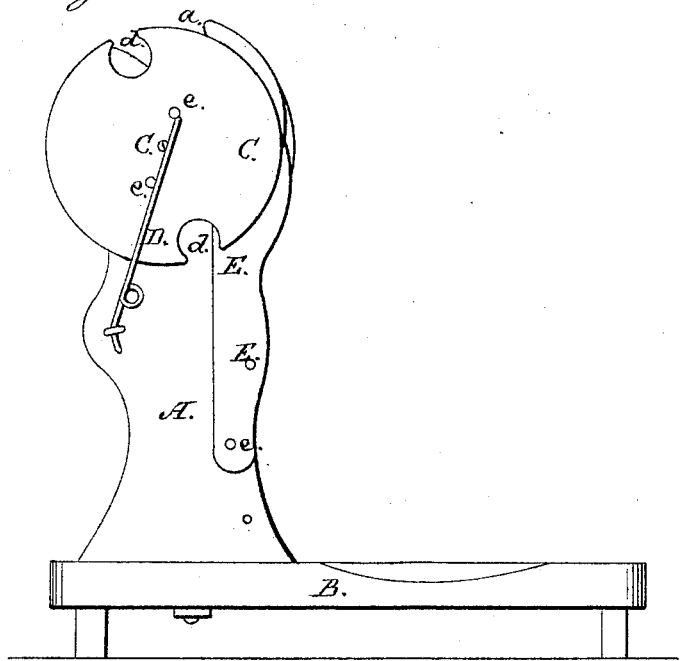
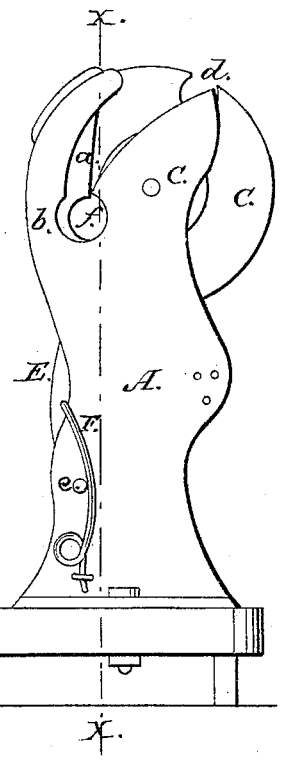
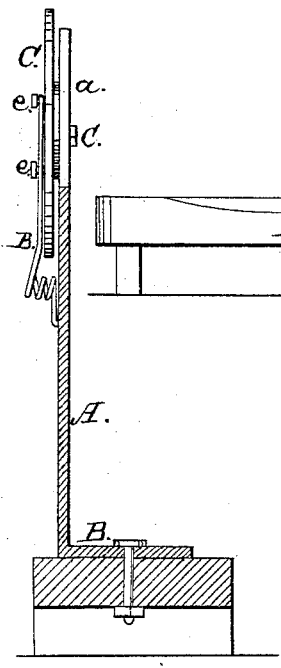
Witnesses:
Witnesses:

UNITED STATES PATENT OFFICE.

L. R. WITHERELL, OF GALESBURG, ILLINOIS.

IMPROVEMENT IN INSTRUMENTS FOR STRIPPING SUGAR-CANE.

Specification forming part of Letters Patent No. 49,577, dated August 22, 1865.

*To all whom it may concern:*

Be it known that I, L. R. WITHERELL, of Galesburg, in the county of Knox and State of Illinois, have invented a new and Improved Device for Stripping Sugar-Cane; and I do hereby declare that the following is a full, clear, and exact description thereof, which will enable others skilled in the art to make and use the same, reference being had to the accompanying drawings, forming part of this specification, in which—

Figure 1 is a side view of my invention; Fig. 2, a vertical section of the same, taken in the line $x\ x$, Fig. 3, and Fig. 3 a side view of the same opposite to that shown in Fig. 1.

Similar letters of reference indicate corresponding parts.

This invention consists in the employment or use of a notched wheel in connection with a yielding blade and a fixed standard, all arranged as hereinafter fully shown and described, whereby the leaves may be stripped from the stalks of sorghum or Chinese sugar-cane with the greatest facility.

A represents a standard, which is firmly secured to a bench or any suitable support, B. This standard may be of cast-iron, and it has a curved slot, $a$, in its upper part, the lower end of the slot being enlarged by a circular opening, $b$, as shown clearly in Fig. 3.

C is a wheel, which is also of iron or any hard metal, and has its axis $c$ fitted in the standard A, near its upper end. This wheel C has two notches, $d\ d$, made in its periphery at opposite sides of its axis, and it has two pins, $e\ e$, projecting from its outer side in line with its axis $c$, as shown clearly in Fig. 1. Against these pins $e\ e$ a spring, D, bears, said spring being attached to the standard A. This spring has a tendency to keep the wheel in such a position that one of its notches $d$ will be at the upper part of the lower edge of the slot $a$, as shown in Figs. 1 and 3.

E is a blade the lower end of which is fitted on a pivot, $e$, in the standard A. This blade has a spring, F, bearing against it, which spring has a tendency to keep the blade E pressed toward the axis $c$ of the wheel C, and the edge of the blade E has a semicircular recess or notch, $f$, made in it, as shown in Fig. 3.

The device is used as follows: The operator sits upon the bench B, facing the device, and taking a stalk of sugar-cane in his hands places the small end of it in the upper notch $d$ of the wheel C, and drawing back the stalk the wheel C turns and the stalk passes down to the bottom of the slot $a$, into the circular opening $b$, and opposite or into the notch $f$ of the blade E. The stalk is then drawn through the device laterally from the small to the large end or butt, and the leaves entirely stripped from the stalk by the wheel C and blade E. The springs D F cause the wheel and blade to press against the stalk, so as to render them efficient in stripping off the leaves. When the stalk is drawn entirely through, the spring D throws the wheel C around until the notch $d$ which was at the lower part of the wheel at the commencement of the operation is brought uppermost to receive a succeeding stalk.

Having thus described my invention, I claim as new and desire to secure by Letters Patent—

The standard A, provided with the slot $a$, in combination with the notched wheel C and blade E, all arranged to operate in the manner substantially as and for the purpose set forth.

L. R. WITHERELL.

Witnesses:
H. B. BOGGS,
M. D. COOKE.